W. Chase,

Settee.

No. 3,882. Reissued Mar. 22. 1870.

Witnesses
W. B. Deming
Jas. L. Irwin

Wesley Chase
By Knight Bros
Attorneys

United States Patent Office.

WESLEY CHASE, OF BUFFALO, NEW YORK.

*Letters Patent No.* 90,078, *dated May* 18, 1869; *reissue No.* 3,882, *dated March* 22, 1870.

IMPROVED SETTEE.

The Schedule referred to in these Letters Patent and making part of the same.

I, WESLEY CHASE, of Buffalo, in the county of Erie and State of New York, have invented an Improvement in "Settees" or Seats, of which the following is a specification.

*Nature and Objects of the Invention.*

My invention consists in forming the legs and arms of a settee or seat of any dimensions of timber bent into the required shape, and connecting the legs by girts or ties which support the seat proper, substantially as hereinafter described.

*General Description with Reference to the Drawings.*

In the accompanying drawings—

Similar letters of reference indicate corresponding parts in both views.

Figure 1:
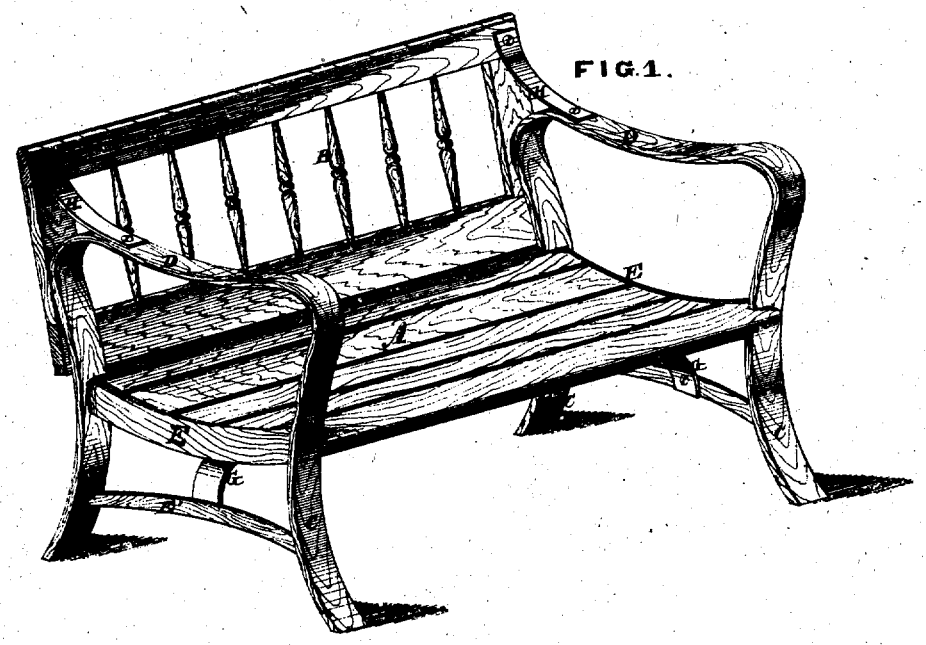
Figure 1 is a perspective view of a settee illustrating my invention.
Figure 2:
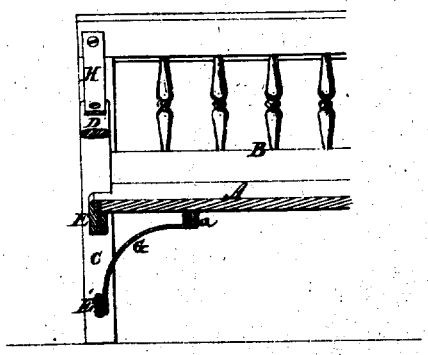
Figure 2 represents a vertical longitudinal section of one end thereof.

A may represent the seat proper, and

B, the back of the settee, both of which may be constructed in any preferred manner.

C C C C represent the legs, and

D D, the arms, each pair of which, C C D, I construct of timber bent into the required shape.

The pairs of legs C C are connected by girts or ties E E, which serve to support the seat proper, as shown.

The legs may also be connected by transverse and longitudinal bars or stays E' F, and the former of said bars may serve also for the attachment of suitable braces G, preferably of metal, and curved, as shown, and which are attached at their other ends, through the medium of transverse cleats *a*, if necessary, to the under side of the seat A.

When the settee or seat is to have a stationary back, the latter may be connected to the rear legs in any convenient way, and at its upper part to the arms, as shown at H H, the pieces marked H constituting a continuation of the arms D, of wood or metal, either formed in one piece with the arms, or attached thereto.

The several parts may be connected together as represented, or in any suitable manner.

By the above construction I am enabled to produce a strong, light, elastic, and ornamental article at a comparatively small cost.

The arms and legs, which have heretofore been the most expensive and troublesome parts, both in the original manufacture and use, owing to the difficulty of sawing out or turning and joining the several parts, and the liability of the parts to become separated or broken, are, by my invention, adapted to be easily and cheaply made entirely free from these objections, and in such a manner as to secure the maximum elasticity and strength of the material used.

The braces, as applied, bind and support the structure without detracting from its elasticity.

*Claim.*

Having thus described my invention,

I claim as new therein, and desire to secure by Letters Patent—

The combination of the bent legs and arms C C D, seat A, and girts or ties E, when constructed and arranged substantially as herein set forth.

WESLEY CHASE.

Witnesses:

OCTAVIUS KNIGHT,

WM. H. BRERETON, Jr.